(12) United States Patent
Onozuka et al.

(10) Patent No.: US 7,564,166 B2
(45) Date of Patent: Jul. 21, 2009

(54) DRIVING APPARATUS, LENS DRIVING APPARATUS AND IMAGE PICKUP APPARATUS

(75) Inventors: Haruo Onozuka, Saitama (JP); Takeshi Ichimiya, Saitama (JP); Motoyoshi Tokumiya, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 12/045,544

(22) Filed: Mar. 10, 2008

(65) Prior Publication Data
US 2008/0238250 A1 Oct. 2, 2008

(30) Foreign Application Priority Data
Mar. 29, 2007 (JP) ............................. 2007-089400

(51) Int. Cl.
*H01L 41/08* (2006.01)
(52) U.S. Cl. .................................. 310/317; 310/323.02
(58) Field of Classification Search ................. 310/317, 310/323.02
See application file for complete search history.

(56) References Cited

U.S. PATENT DOCUMENTS 3,980,906 A * 9/1976 Kuris et al. ................. 310/317
6,433,459 B1 * 8/2002 Okada ........................ 310/317
6,803,699 B2 10/2004 Yuasa et al.
2006/0238075 A1 10/2006 Manabe et al.
2006/0267454 A1 * 11/2006 Ashizawa et al. ...... 310/323.02

* cited by examiner

*Primary Examiner*—Mark Budd
(74) *Attorney, Agent, or Firm*—Birch, Stewart, Kolasch & Birch, LLP

(57) ABSTRACT

A driving apparatus comprises an actuator, the actuator comprising an electromechanical conversion element and a driving shaft attached to the electromechanical conversion element, wherein the driving apparatus expands and contracts the electromechanical conversion element by applying a driving signal to the electromechanical conversion element and reciprocally moves the driving shaft in accordance with expansion and contraction movement of the electromechanical conversion element so as to move a driven member frictionally engaged with the driving shaft, and wherein the driving signal is a pulse signal, and half of a time period corresponding to a reciprocal of a lowest resonance frequency in the actuator is set as a shorter output time among a high output time period and a low output time period of the drive signal.

12 Claims, 8 Drawing Sheets

DRIVING APPARATUS, LENS DRIVING APPARATUS AND IMAGE PICKUP APPARATUS

BACKGROUND OF THE INVENTION

1. Field of the Invention

The present invention relates to a driving apparatus using an electromechanical conversion element such as a piezoelectric element, a lens driving apparatus and an image pickup apparatus using the same.

2. Description of the Related Art

In the related art, as a driving apparatus using an electromechanical conversion element such as a piezoelectric element, there is known a driving apparatus which includes an electromechanical conversion element which expands and contracts in accordance with a voltage applied thereto, a drive friction member fixed to one end in the expansion and contraction direction of the electromechanical conversion element, an engaging member frictionally engaging with the drive friction member, and a driving circuit which applies the voltage to the electromechanical conversion element (for example, Japanese Patent No. 3646154).

The driving apparatus of Japanese Patent No. 3646154 intends to perform a low speed driving stably by inputting a predetermined driving signal to the electromechanical conversion element. In such a kind of driving apparatus, it is desired to improve the driving efficiency and move a driven member at a high speed as high as possible.

SUMMARY OF THE INVENTION

Accordingly, the invention has been made in order to solve the aforesaid problem of the related art and an object of the invention is to provide a driving apparatus which can increase the moving speed of a driven member, a lens driving apparatus and an image pickup apparatus using the same.

According to an aspect of the invention, there is provided a driving apparatus comprising an actuator, the actuator comprising an electromechanical conversion element and a driving shaft attached to the electromechanical conversion element, wherein the driving apparatus expands and contracts the electromechanical conversion element by applying a driving signal to the electromechanical conversion element and reciprocally moves the driving shaft in accordance with expansion and contraction movement of the electromechanical conversion element so as to move a driven member frictionally engaged with the driving shaft, and wherein the driving signal is a pulse signal, and half of a time period corresponding to a reciprocal of a lowest resonance frequency in the actuator is set as a shorter output time among a high output time period and a low output time period of the drive signal.

According to the invention, pulse signals are used as the driving signal for the electromechanical conversion element, and the time period half of the period corresponding to the reciprocal of the lowest resonance frequency in the actuator is set as the shorter output time among the high output time periods and the low output time periods of the drive signal. Thus, the moving speed of the driven member can be made higher.

In the driving apparatus according to the invention, in a case where an off output is set in the driving signal, it is preferred that the half of the time period corresponding to the reciprocal of the lowest resonance frequency is set as the shorter output time among the high output time period and the low output time period, while the time period of the off output appearing after high output or low output is contained in the high output period or the low output period.

Further, in the driving apparatus according to the invention, it is preferred that the actuator is supported from side direction in expansion and contraction directions of the electromechanical conversion element and attached, and each of both ends of the actuator serves as a free end movable in the expansion and contraction directions.

DETAILED DESCRIPTION OF THE INVENTION

Hereinafter, an embodiment of the intention will be explained with reference to accompanying drawings. In the explanation of the drawings, same elements are referred to by the common symbols, with duplicated explanation thereof being omitted.

Figure 1:
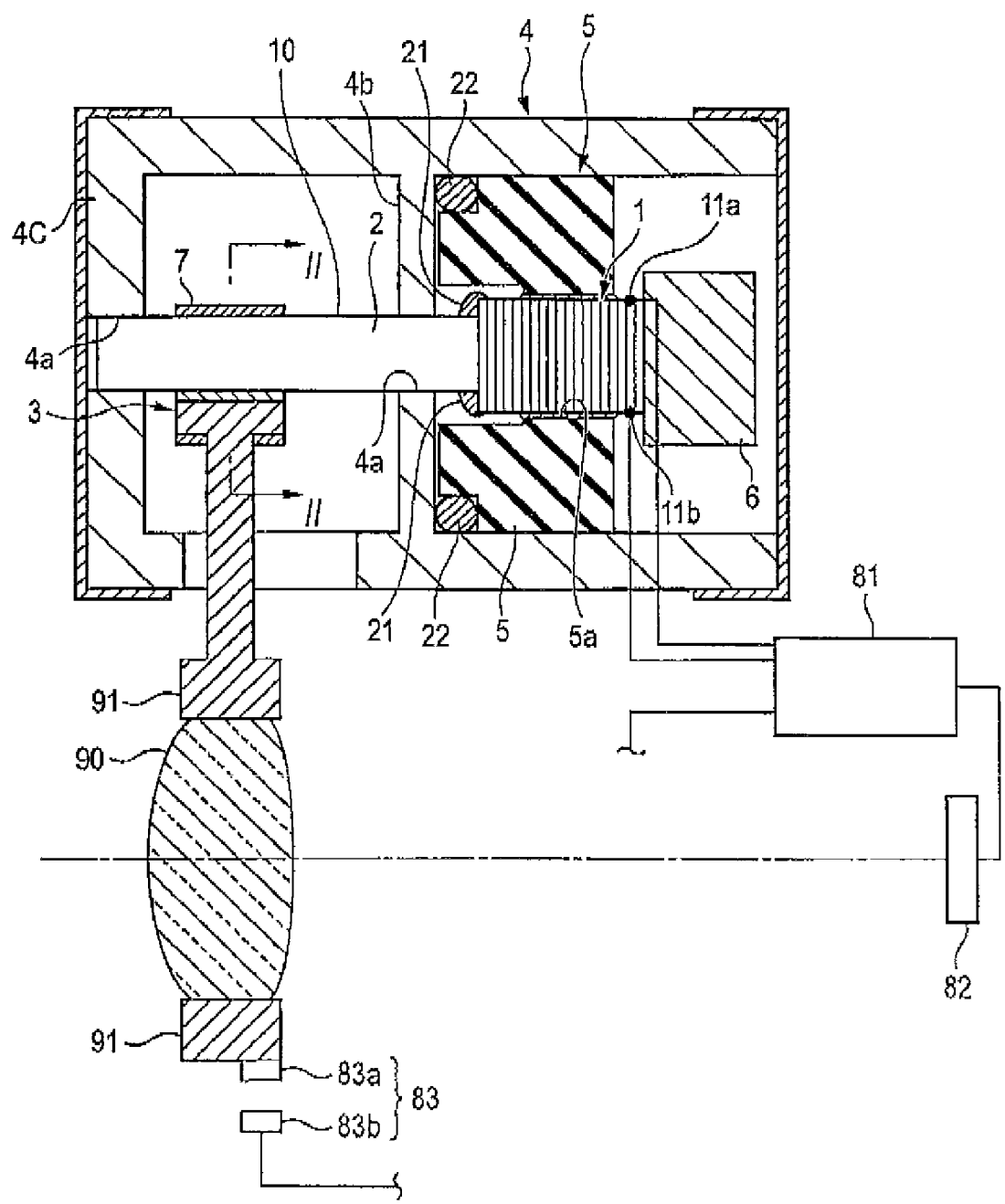
FIG. 1 is a sectional diagram showing a driving apparatus according to the embodiment of the invention.

FIG. 1 is a sectional diagram of a driving apparatus according to the embodiment. As shown in FIG. 1, the driving apparatus according to the embodiment is constituted to include an actuator 10 configured by attaching a driving shaft 2 to a piezoelectric element 1, to reciprocally move the driving shaft 2 in accordance with the expansion and contraction of the piezoelectric element 1, and to move a driven member 3 frictionally engaging with the driving shaft 2 along the driving shaft 2.

The piezoelectric element 1 is an electromechanical conversion element which can expand and contract in a predetermined direction in accordance with a driving signal applied thereto. The piezoelectric element 1 is coupled to a control portion 81 and expands and contracts when receiving an electric signal from the control portion 81. For example, the piezoelectric element 1 is provided with two input terminals 11a, 11b. The piezoelectric element 1 repeatedly expands and contracts when the voltages applied to the input terminals 11a, 11b are repeatedly increased and reduced.

The electromechanical conversion element may employ an element other than the piezoelectric element 1 so long as the element expands and contracts in accordance with the driving signal.

The driving shaft 2 is attached to the piezoelectric element 1 in a manner that the longitudinal direction thereof coincides with the expansion and contraction directions of the piezoelectric element 1. For example, the one end of the driving shalt 2 is abutted against the piezoelectric element 1 and adhered thereto by using adhesive 21. The driving shaft 2 is a long member of a cylindrical shape, for example. The driving shaft 2 is supported so as to be movable in the longitudinal direction by a partition portion 4b and a partition portion 4c each extending inside from a fixed frame 4. Each of the partition portion 4b and the partition portion 4c is a member for partitioning the movable area of the driven member 3 and also acts as a support member for the driving shaft 2. The fixed frame 4 acts as a casing for housing the piezoelectric element 1, the driving shaft 2 and the driven member etc. therein and assembling them.

Light-weighted and high-rigidity material is suitable for the material of the driving shaft 2 and beryllium is ideal material satisfying such conditions. However, this material is rare metal and so has drawbacks that the price is high and the forming property is bad. Thus, in this embodiment, graphite compound which is formed by rigidly conjugating graphite crystal, for example, carbon graphite is employed. (In this case, the graphite compound means compound of graphite, which is hexagonal plate-shaped crystallization of carbon, and material other than graphite, and the carbon graphite means material formed by graphite and amorphous carbon. Further, graphite is also called as block lead.) The carbon graphite as the graphite compound has property similar to beryllium (the specific gravity of beryllium is about 1.85 and that of the carbon graphite is about 1.8) but also has properties that, unlike beryllium, the cost is relatively low and the forming property is good. The shape of the driving shaft 2 is not limited to cylindrical but may be rectangular columnar.

Each of the partition portions 4b and 4c is provided with a through hole 4a for passing the driving shaft 2 therethrough. The partition portion 4b supports a portion near the attachment portion of the piezoelectric element 1 of the driving shaft 2, that is, the base end portion of the driving shaft 2. The partition portion 4c supports the tip end portion of the driving shaft 2. Since the driving shaft 2 is attached to the piezoelectric element 1, the piezoelectric element reciprocally moves along its longitudinal direction in accordance with the repetitive expansion and contraction operations of the piezoelectric element 1.

FIG. 1 shows the case where the driving shaft 2 is supported at the two portions, that is, the tip end side and the base end side thereof by the partition portions 4b, 4c. However, there is a case where the driving shaft 2 is supported at one of the tip end side and the base end side thereof. For example, when the diameter of the through hole 4a of the partition portion 4b is formed to be larger than the outer diameter of the driving shaft 2, the driving shaft 2 is supported only at its tip end portion by the partition portion 4c. In contrast, when the diameter of the through hole 4a of the partition portion 4c is formed to be larger than the outer diameter of the driving shaft 2, the driving shaft 2 is supported only at its base end portion by the partition portion 4b.

Further, although FIG. 1 shows the case where the partition portions 4b, 4c for supporting the driving shaft 2 is integrated with the fixed frame 4, the partition portions 4b, 4c may be provided separately from the fixed frame 4 and then attached thereto. Even if the partition portions are provided separately from the fixed frame, the function and effects similar to those in the case where the partition portions are provided integrally with the fixed frame can be obtained.

The driven member 3 is attached to the driving shaft 2 so as to be movable. The driven member 3 is frictionally engaged with the driving shaft 2 and is movable along the longitudinal direction of the driving shaft 2. For example, the driven member 3 is attached to the driving shaft in a manner that the driven member is made in contact with the driving shaft 2 by a leaf spring 7 so as to engage therewith at a predetermined friction coefficient, and a constant friction force is caused when the driven member moves since the driven member is pressed against the driving shaft 2 by a constant pressing force. When the driving shaft 2 moves so as to exceed the friction force, the driven member 3 maintains its position due to the inertia and so the driving shaft 2 moves relatively with respect to the driven member 3.

The piezoelectric element 1 is attached to the fixed frame 4 by means of a support member 5. The support member 5 serves to attach the piezoelectric element to the fixed frame in a manner that the support member supports the piezoelectric element 1 from the side direction with respect to the expansion and contraction direction thereof. The support member is disposed between the piezoelectric element 1 and the fixed frame 4. In this case, the support member 5 preferably supports the piezoelectric element 1 from the direction orthogonal to the expansion and contraction direction thereof. The support member 5 serves as an attachment member for attaching the piezoelectric element in a manner of supporting the piezoelectric element 1 from the side direction thereof.

In this manner, the actuator 10 is supported by the support member 5 from the side direction with respect to the expansion and contraction direction of the piezoelectric element 1, and so the both ends of the actuator 10 serve as free ends movable in the expansion and contraction direction of the piezoelectric element 1. Thus, when the actuator 10 is driven, the vibration due to the expansion and contraction of the piezoelectric element 1 is hardly transmitted to the fixed frame 4 side. Therefore, it is effective to set the driving signal of the actuator 10 in relation to the resonance frequency of the actuator 10.

The support member 5 is formed by elastic material having predetermined elastic characteristics or more, for example, by silicon resin. The support member 5 is configured so as to have the insertion hole 5a for inserting the piezoelectric element 1 thereinto and is assembled into the fixed frame 4 in a state that the piezoelectric element 1 is inserted into the insertion hole 5a. The support member 5 is fixed to the fixed frame 4 by means of adhesive 22. The support member 5 is also fixed to the piezoelectric element 1 by means of adhesive. Since the support member 5 is formed by the elastic material, the support member 5 can support the piezoelectric element 1 so as to be movable in the expansion and contraction thereof. In FIG. 1, although the two support members 5 are shown on the both sides of the piezoelectric element 1, the support member 5 is shown in the two pieces 5, 5 in its sectional view.

The support member 5 may be fixed to the fixed frame 4 and the piezoelectric element 1 in a manner that the support member 5 is pressed between the fixed frame 4 and the piezoelectric element 1 and then the fixed frame and the piezoelectric element are pressed by the support member 5. For example, the support member 5 is formed by the elastic material so as to have a width larger than a space between the fixed frame 4 and the piezoelectric element 1, and the support member is pressed therebetween. Thus, the support member 5 is disposed in a closely adhered member between the fixed frame 4 and the piezoelectric element 1. In this case, the piezoelectric element 1 is pressed from the both ends thereof orthogonal to the expansion and contraction thereof by the support member 5, whereby the piezoelectric element 1 is supported.

Although the explanation is made as to the case where the support member 5 is formed by the silicon resin, the support member 5 may be formed by a spring member. For example, the spring member may be disposed between the fixed frame 4 and the piezoelectric element 1 so as to support the piezoelectric element 1 with respect to the fixed frame 4 by the spring member.

A movable lens 90 is attached to the driven member 3 via a lens frame 91. The movable lens 90 constitutes the image pickup optical system of a camera and a subject moved by the driving apparatus. The movable lens 90 is provided integrally with the driven member 3 so as to move together with the driven member 3. A not-shown fixed lens etc. are disposed on the optical axis O of the movable lens 90 thereby to constitute the image pick-up optical system of the camera. Further, an image pickup element 82 is disposed on the optical axis O. The image pickup element 82 is an image-pickup element which converts an image picked-up by the image pickup optical system into an electrical signal and is formed by a CCD, for example. The image pickup element 82 is coupled to the control portion 81 and outputs the image signal to the control portion 91.

The weight member 6 is attached to the end portion of the piezoelectric element 1. The weight member 6 acts to transmit the expansion and contraction force of the piezoelectric element 1 on the driving shaft 2 side and so attaché to the end portion of the piezoelectric element 1 on the opposite end portion side thereof where the driving shaft 2 is attached.

The weight member 6 constitutes a part of the actuator 10. The weight member 6 is selected to have a weight lager than that of the driving shaft 2. The weight member 6 is preferably formed by mixing metallic powder into an elastically deformable member. The weight of the weight member can be made large by mixing the metal powder, and the unnecessary resonance of the weight member can be reduced at the time of the operation of the piezoelectric element 1 by employing the elastically deformable member.

The material of the weight member 6 is selected to have a Young's modulus smaller than those of the piezoelectric element 1 and the driving shaft 2. The Young's modulus of the weight member 6 is preferably 1 GPa or less and more preferably 300 Mpa or less. Such the weight member 6 can be formed by mixing the metallic power having a large specific gravity into elastic material such as robber. For example, the weight member can be manufactured by mixing tungsten powder into urethane rubber or urethane resin. The specific gravity of the weight member 6 is preferably as high as possible in order to miniaturize the apparatus and so set almost in a range from 8 to 12, for example. The Young's modulus and the specific gravity of the weight member 6 manufactured by mixing tungsten powder into urethane rubber or urethane resin are almost 60 Mpa and 11.7, respectively. Thus, in the case of designing the weight member 6 so as to have a volume as stall as possible, such a combination is best where the specific gravity is as large as possible and the Young's modulus is small. However, the weight member is useful so long as the specific gravity thereof is larger than that of the driving shaft 2 (1.8 or more) and the Young's modulus thereof is 1 GPa or less. That is, the weight member 6 is suitable when a numerical value obtained by dividing the specific gravity by the Young's modulus (specific gravity/Young's modulus) is $1.8 \times 10^{-9}$ or more. The adhesive for fixing the weight member 6 with the piezoelectric element 1 is preferably elastic adhesive.

Further, the weight member 6 is provided in a state of not being supported by or fixed to the fixed frame 4. That is, the weight member 6 is provided in a state that the weight member is attached to the free end of the piezoelectric element 1 and not directly supported by or fixed to the fixed frame 4, and further is not directly supported by or fixed so as to be restricted in its movement with respect the fixed frame 4 via adhesive or resin material.

The driving apparatus is provided with a detector 83 for detecting the moving position of the driven member 3. For example, an optical detector having a photo reflector or a photo interrupter etc. is employed as the detector 83. To be concretes in the case of using the detector 83 having a reflector 83a and a detection portion 83b, the reflector 83a is attached to the lens frame 91 integrally formed with the driven member 3, whereby detection light is emitted from the detection portion 83b to the reflector 83a side and the detection portion 83b detects reflection light reflected from the reflector 83a side thereby to detect the moving position of the driven member 3 and the movable lens 90.

The detector 83 is coupled to the control portion 81. An output signal from the detector 83 is inputted into the control portion 81. The control portion 81 serves to control the driving apparatus entirely and is configured by a CPU, a ROM, a RAM, an input signal circuit and an output signal circuit etc., for example. The control portion 81 includes a driving circuit for operating the piezoelectric element 1 and supplies an electric signal for driving to the piezoelectric element 1.

Figure 2:
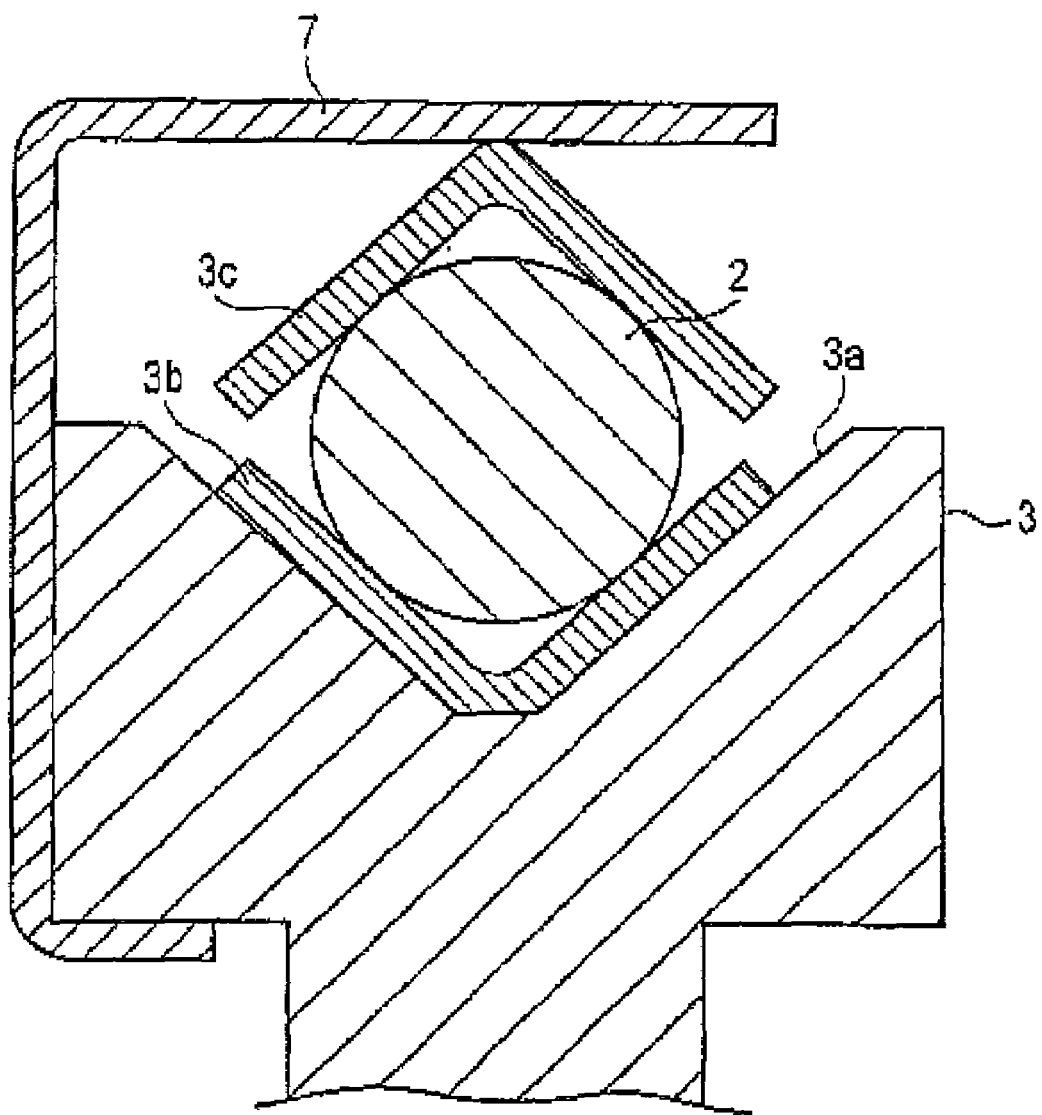
FIG. 2 is a sectional diagram showing a driven member cut along a line II-II in FIG. 1.

FIG. 2 is a sectional diagram showing a frictionally engaging portion of the driven member 3 cut along a line II-II in FIG. 1.

As shown in FIG. 2, the driven member 3 is attached to the driving shaft 2 since the driving shaft 2 is pressed by the leaf spring 7. For example, a groove 3a of a V-shape for positioning the driving shaft 2 is formed in the driven member 3. A sliding plate 3b of a V-shape in its section is disposed in the groove 3 at whereby the driving shaft 2 is pressed against the driven member 3 via the sliding plate 3b.

A sliding plate 3c of a V-shape in its section is disposed between the leaf spring 7 and the driven member 3. The leaf spring 7 presses the driven member 3 via the sliding plate 3c. The sliding plates 3b, 3c are disposed in a manner that the concave portion sides thereof are opposed to each other so as to sandwich the driving shaft 2 therebetween. Since the driving shaft 2 is housed within the V-shaped groove 3a, the driven member 3 can be attached to the driving shaft 2 stably.

A leaf spring member of an L-shape in its section, for example, is used as the leaf spring 7. When one side of the leaf spring 7 is engaged with the driven member 3 and the other end thereof is disposed at a position opposing to the groove 3a, the driving shaft 2 housed within the groove 3a can be sandwiched between the driven member 3 and the other end of the leaf spring.

In this manner, since the driven member 3 is attached in a manner of being pressed by a constant force against the driving shaft 2 side by the leaf spring 7, the driven member 3 is frictionally engaged with the driving shaft 2. That is, the driven member 3 is attached in a manner that the driven member 3 is pressed against the driving shaft 2 with the constant pressing force and so a constant friction force is caused when the driven member moves.

Further, since the driving shaft 2 is sandwiched between the sliding plates 3b, 3c each having the V-shape in its section, the driven member 3 is made in line-contact with the driving shaft 2 at plural points thereof, whereby the driven member can be frictionally engaged with the driving shaft 2 stably. Furthermore, since the driven member 3 is made in line-contact with the driving shaft 2 at the plural points thereof, the driven member 3 is substantially placed in a state of being engaged with the driving shaft 2 in a plane-contact state, whereby a stable frictional engagement can be realized.

Figure 3:
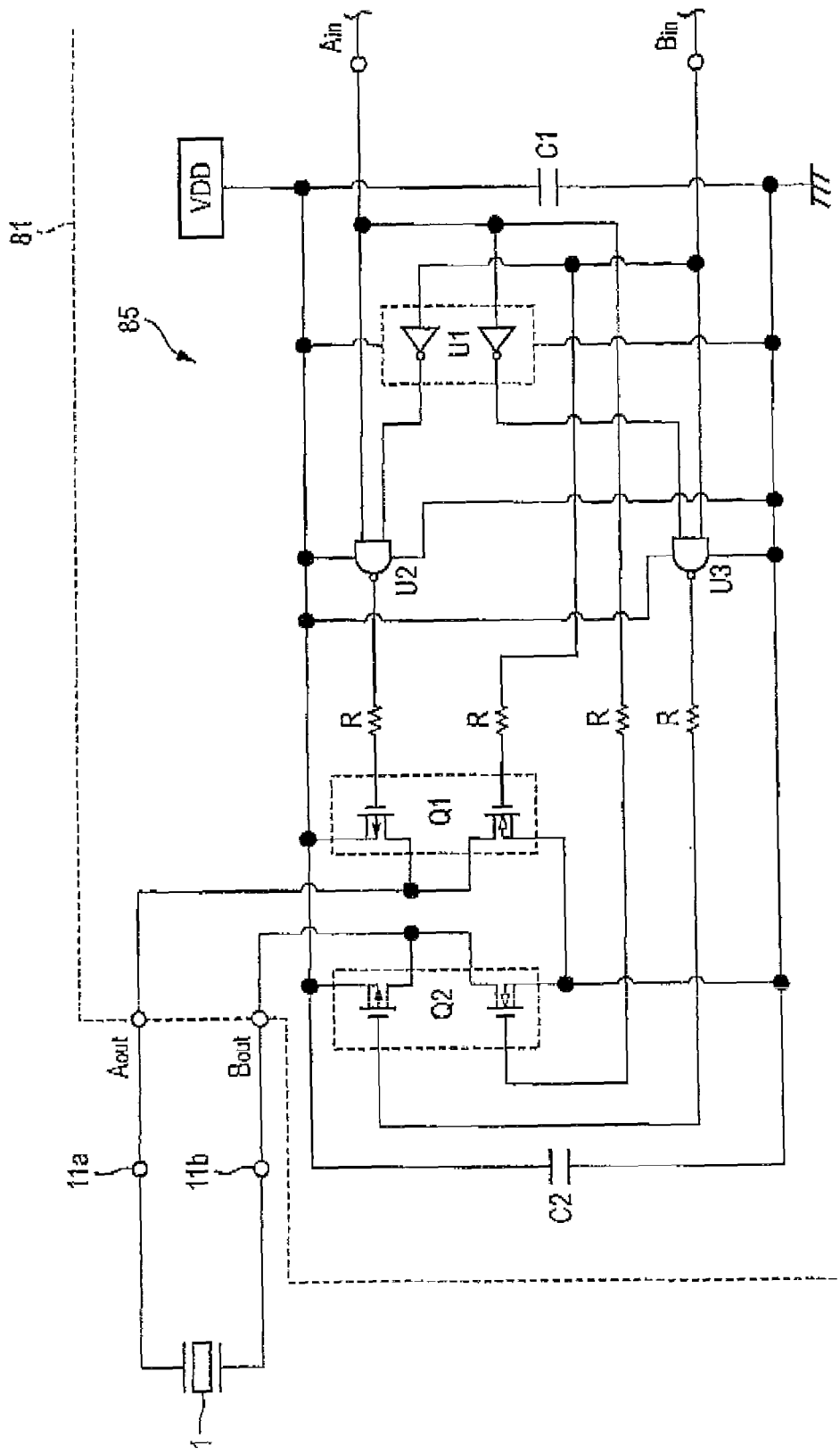
FIG. 3 is a circuit diagram showing a driving circuit in the driving apparatus in FIG. 1.

FIG. 3 is a circuit diagram showing a driving circuit for operating the piezoelectric element 1.

As shown in FIG. 3, the driving circuit 85 is disposed within the control portion 81. The driving circuit 85 acts as a driving circuit for the piezoelectric element 1 and outputs the electric signal for driving to the piezoelectric element 1. The driving circuit 85 inputs a control signal from the control signal generation portion (not shown) of the control portion 81, then voltage-amplifies or current-amplifies the control signal and outputs the amplified signal to the piezoelectric element 1 as the driving electric signal. As the driving circuit 85, there is employed one which input stage is configured by logic circuits U1 to U3 and output stage is configured by field effect transistors (FETs) Q1, Q2, for example. Each of the transistors Q1, Q2 is configured so as to be able to output a Hi output (high-voltage output), a Lo output (low-voltage output) and an OFF output (off output or open output) as an output signal.

The driving circuit thus configured is an example of the circuits for operating the piezoelectric element 1 and the piezoelectric element 1 may ha operated by using a circuit configured in a different manner.

Figure 4A:
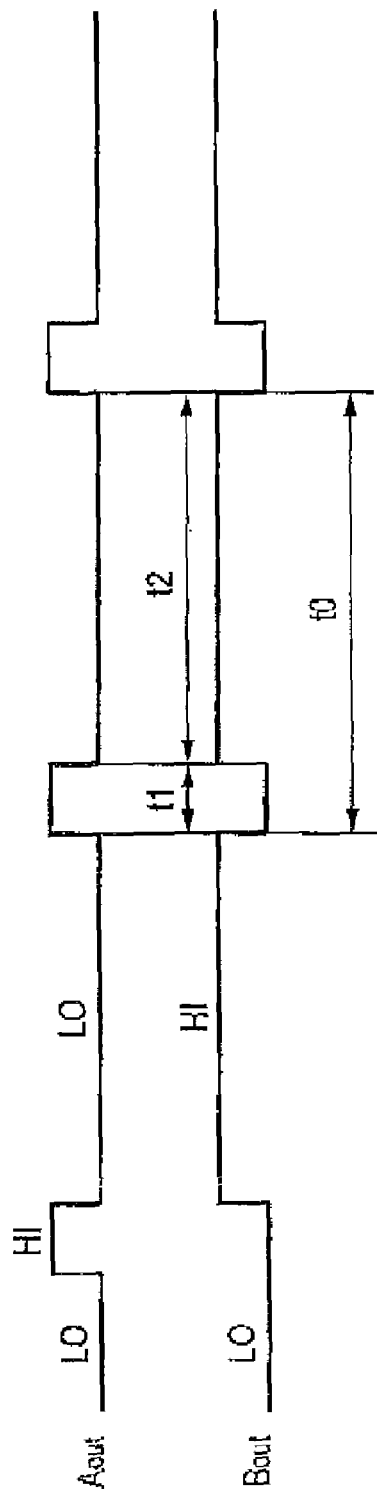
FIGS. 4A and 4B are diagrams showing waveforms of a driving signal inputted into the piezoelectric element of the driving apparatus in FIG. 1.
Figure 4B:
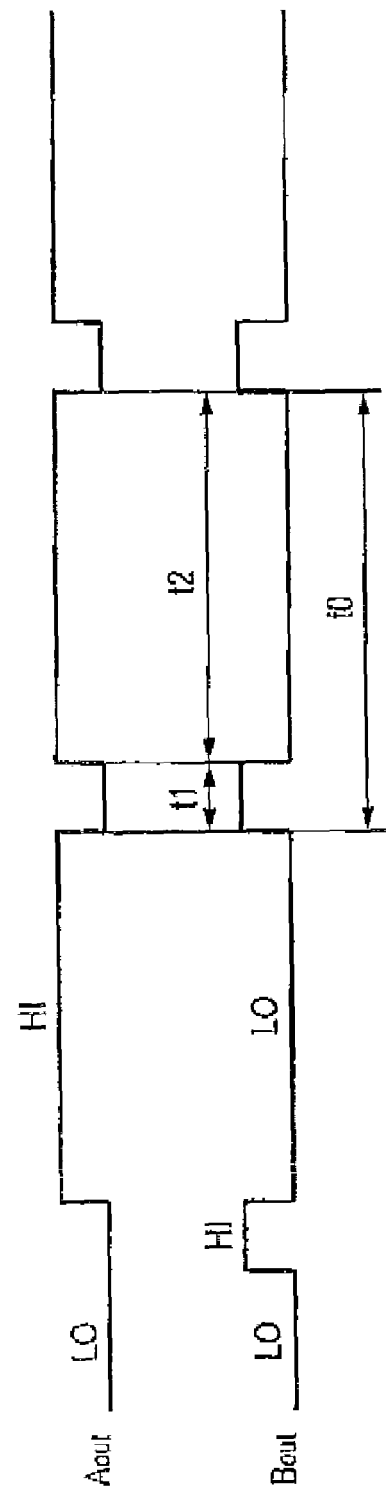

FIGS. 4A and 4B show an example of the driving signal outputted from the driving circuit 85.

FIG. 4A shows the driving signal inputted into the piezoelectric element 1 in the case of moving the driven member 3 in a direction (right direction in FIG. 1) approaching the piezoelectric element 1, and FIG. 4D shows the driving signal inputted into the piezoelectric element 1 in the case of moving the driven member 3 in a direction (left direction in FIG. 1) separating from the piezoelectric element 1.

In the driving signals shown in FIGS. 4A and 4B, an Aout signal is applied to the one input terminal 11a of the piezoelectric element 1 and a Bout signal is applied to the other input terminal 11b of the piezoelectric element 1. Thus, the difference between the signals Aout and Bout is applied to the piezoelectric element 1 as the input voltage.

Although the driving signal of FIGS. 4A and 4B has a rectangular waveform, the waveform actually inputted into the piezoelectric element 1 is a triangular waveform due to the capacitor component of the piezoelectric element 1. Thus, when the duty ratio between the high and low levels of the driving signal is not 50%, the expansion speed and the contraction speed of the piezoelectric element 1 can be differentiated by the driving signal of the rectangular shape inputted to the piezoelectric element thereby to move the driven member 3.

Each of the driving signals shown in FIGS. 4A and 4B is a pulse signal, and as an output time period of shorter one between the high (Hi) output time period and the low (Lo) output time period of the pulse signal, a time period half of a period corresponding to a reciprocal of the lowest resonance frequency in the actuator 10 is set.

For example, in the driving signals shown in FIGS. 4A and 4B, as the shortest output time among the high (Hi) output time periods and the low (Lo) output time periods of the Aout and Bout signals, a time period half of a period corresponding to a reciprocal of the lowest resonance frequency in the actuator 10 is set. In this case, the "time period half of a period corresponding to a reciprocal of the lowest resonance frequency" contains not only the time period being half but also the time period almost half. For example, a time period deviated by a range from 20% to −20% from the time period being half may be set as the shortest output time among the high output time periods and the low output time periods of the drive signal. Further, more preferably, a time period deviated by a range from 10% to −10% from the time period being half may be set as the shortest output time among the high output time periods and the low output time periods of the drive signal.

Figure 5:
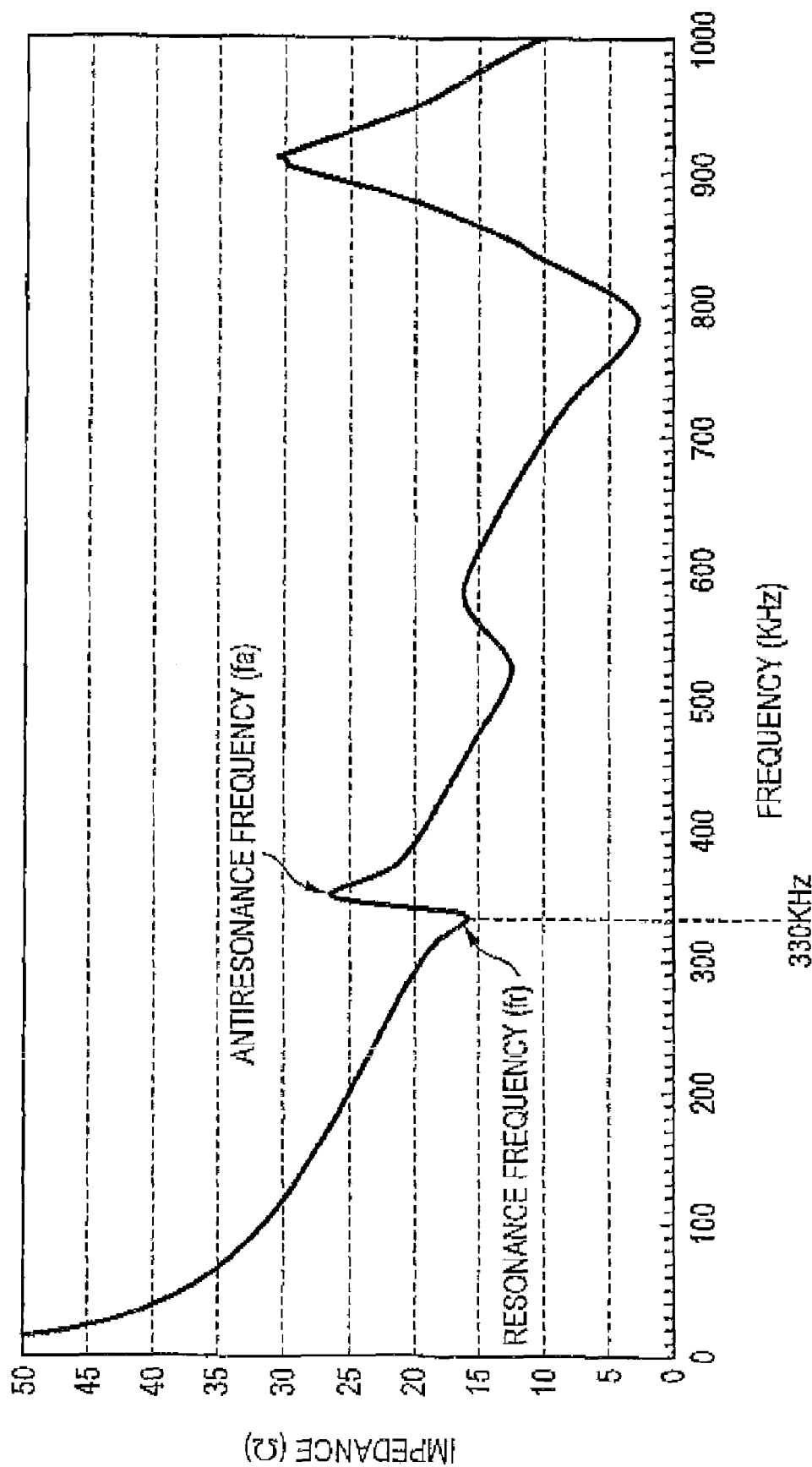
FIG. 5 is a diagram showing the relation between the driving frequency and the impedance of the actuator of the driving apparatus in FIG. 1.

FIG. 5 shows the relation between the driving frequency and the impedance of the actuator 10.

The driving frequency/impedance characteristics shown in FIG. 5 is obtained by measuring the impedance of the piezoelectric element 1 in the case where the piezoelectric element 1 attached with the driving shaft 2 and the weight member 6 is used as the actuator 10 and the frequency of the driving signal inputted to the piezoelectric element 1 is changed.

As shown in FIG. 5, a frequency where the impedance drops on the lowest frequency side, that is, a resonance frequency fr is 330 KHz. That is, the lowest resonance frequency of the actuator 10 is 330 KHz and a period T corresponding to the reciprocal thereof is 3.0, second. The time period half of the period is 1.5 μl second. The time period half of the period, that is, 1.5 μl second is set as the shortest time period t1 among the high output time periods and the low output time periods of the drive signal.

When the driving signal is set in this manner and the driving signal is inputted into the piezoelectric element 1, the driven member 3 can be moved in a highest-speed state.

Figure 6:
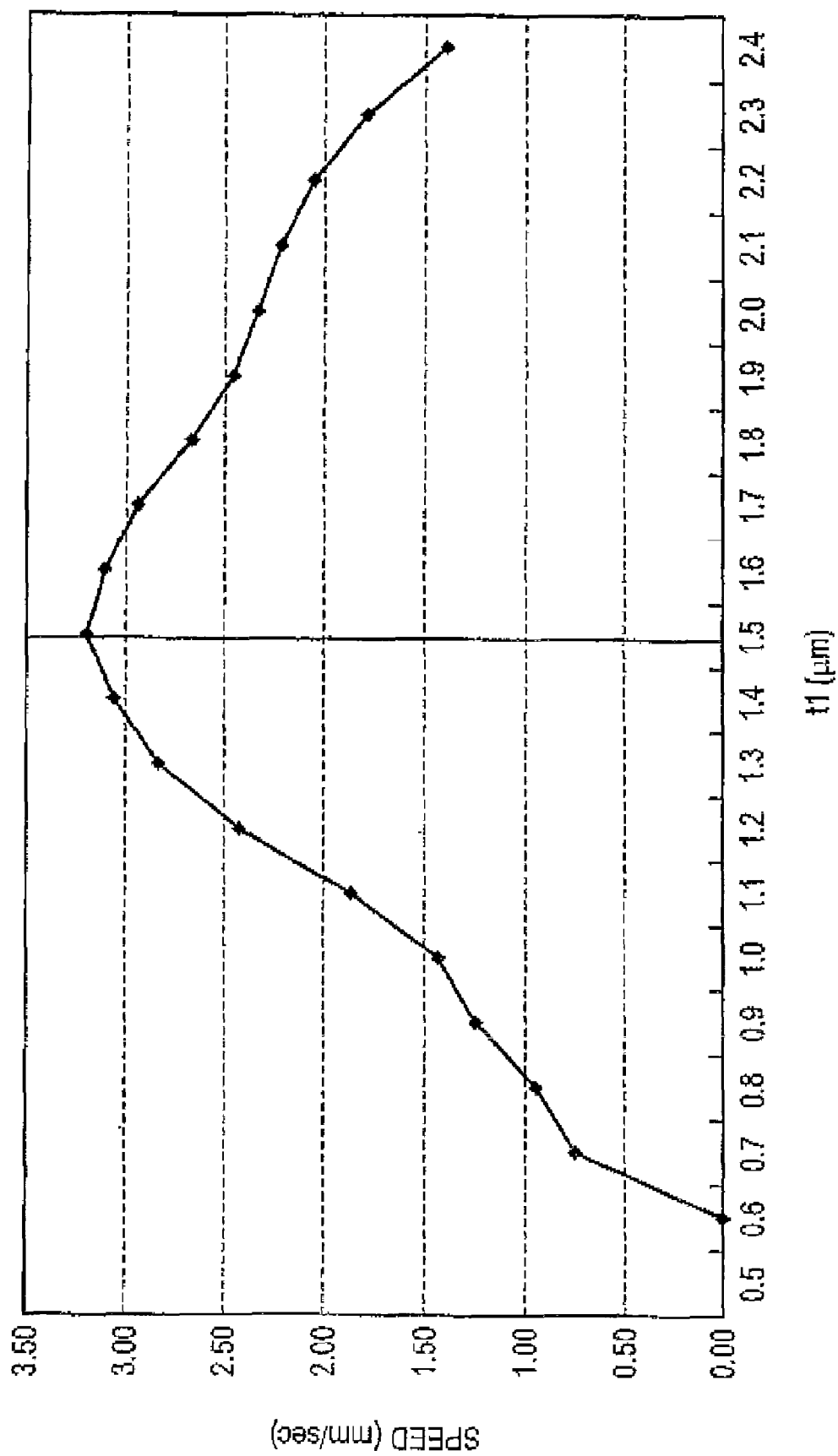
FIG. 6 is a diagram showing the relation between a pulse time period t1 and the moving speed in the driving apparatus in FIG. 1.

FIG. 6 shows the relation between the time period t1 of the driving signal and the moving speed of the driven member 3.

The relation shown in FIG. 6 is obtained by measuring the moving speed of the driven member 3 in the case where the time period t1 of the driving signal inputted into the piezoelectric element 1 of the driving apparatus is changed. In this measurement, the moving speed is measured in a manner that the frequency of the driving signal is set to 53 kHz and only the time period t1 is changed. As shown in FIG. 6, the moving speed becomes faster when the time period t1 is made longer gradually from a short time period, then reaches the maximum speed near the time period of 1.5μ second and becomes slower as the time period t1 is made more longer.

In this manner, when the time period half of the period corresponding to the reciprocal of the lowest resonance frequency in the actuator 10 is set as the shortest output time among the high output time periods and the low output time periods of the drive signal, the driving speed of the driving apparatus can be set to the highest speed state.

Figure 7A:
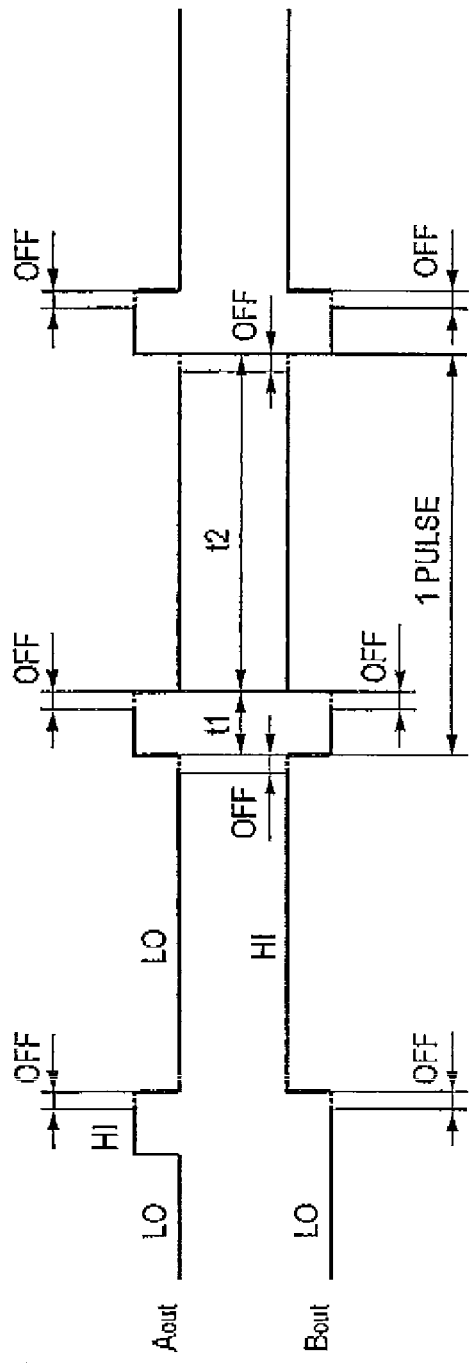
FIGS. 7A and 7B are diagrams showing a modified example of the driving signal in the driving apparatus in FIG. 1.
Figure 7B:
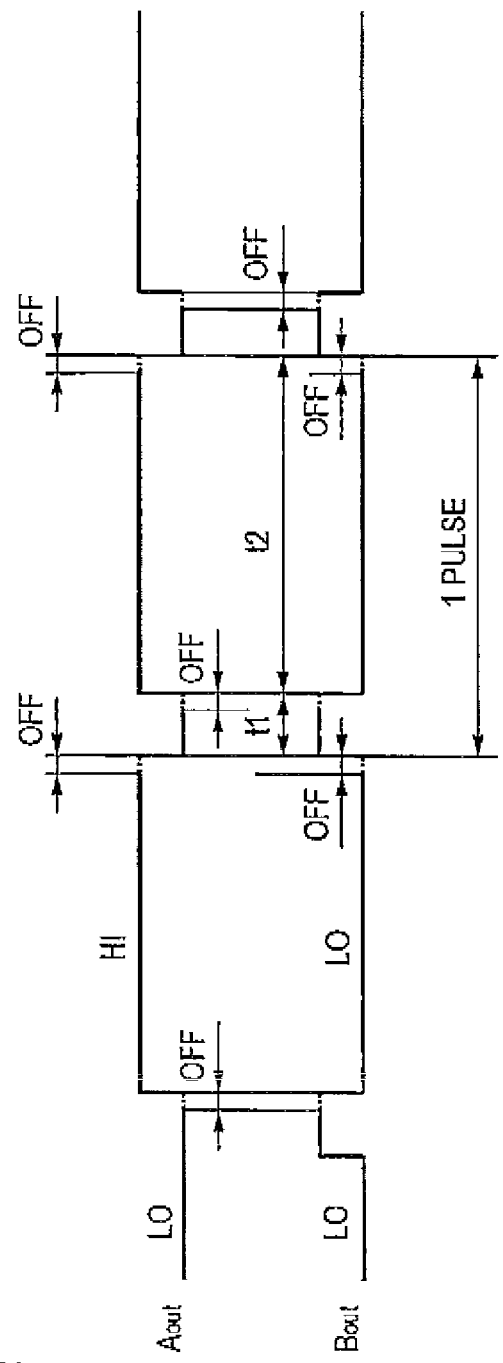

Further, as shown in FIGS. 7A and 7D, there is a case where an off output is set in addition to the high output and the low output. When the off output is set in this manner, a through current is prevented from flowing through the transistors Q1, Q2 of the driving circuit 85 in the case of changing the output between the high output and the low output. In this case, the time period (t1 in FIGS. 7A and 7B) half of the period is preferably set so as to also contain the off output performed after the high output and the low output. When the time period half of the period is set in this manner, the moving speed of the driven member 3 can be set to the highest speed state.

Figure 8A:
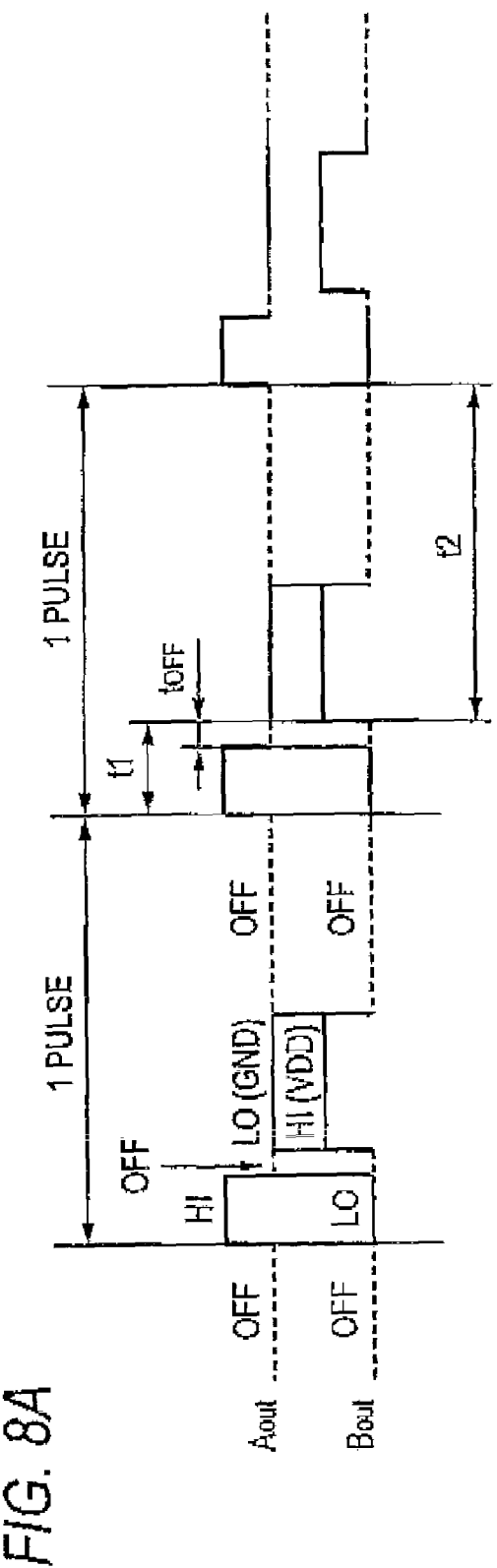
FIGS. 8A and 8B are diagrams showing another modified example of the driving signal in the driving apparatus in FIG. 1.
Figure 8B:
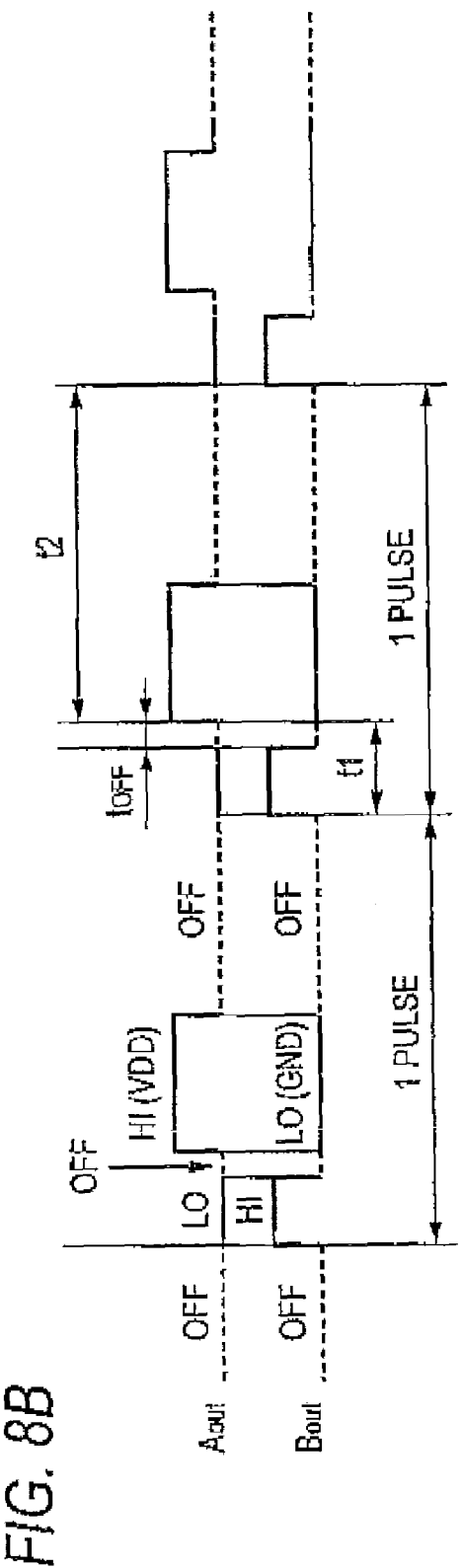

The driving signal may be formed in a manner that the waveform inputted into the piezoelectric element 1 exhibits a stepwise shape. For example, as shown in FIGS. 8A and 8B, the driving signal is formed by two rectangular pulse signals having the same frequency in a manner that the phases of these two pulse signals are made different thereby to form the signals in which the voltage difference therebetween becomes larger stepwise and becomes smaller rapidly or the signals in which the voltage difference therebetween becomes larger rapidly and becomes smaller stepwise. When such the two kinds of signals are inputted, the expansion speed and the contraction speed of the piezoelectric element 1 can be made different thereby to move the driven member 3.

A signal having the frequency exceeding the audio frequency is employed as the driving signal for the driving apparatus according to the embodiment. In FIGS. 4A and 4B, 7A and 7B and 8A and 8B, each of the two signals Aout and Bout is set to have a frequency exceeding the audio frequency and so set to have a frequency in a range from 30 to 80 Hz, for example, and preferably in a range from 40 to 60 Hz. When the signals each having such the frequency range is used, operation sound in the audio frequency generated from the piezoelectric element 1 can be reduced.

Next, the operation of the driving apparatus according to the embodiment will be explained.

In FIG. 1, when the driving signal is inputted into the piezoelectric element 1, the piezoelectric element 1 repeatedly expands and contracts in accordance with the driving signal. The driving shaft 2 reciprocally moves in accordance with the expansion and contraction of the piezoelectric element. In this case, when the expansion speed and contraction speed of the piezoelectric element 1 are made-different, the speed of the driving shaft 2 moving in the one direction differs from the speed thereof in the opposite direction. Thus, the driven member 3 ands the movable lens 90 can be moved in a desired direction.

When the piezoelectric element 1 expands and contracts, a vibration is caused due to the expansion and contraction thereof. However, since the piezoelectric element 1 is supported from the side direction with respect to the expansion and contraction directions by the support member 5, the vibration caused by the expansion and contraction of the piezoelectric element 1 is hardly transmitted to the outside of the piezoelectric element 1 and the driving shaft 2. Thus, the piezoelectric element 1 and the driving shaft 2 are suppressed from resonating with the external members such as the fixed frame 4 and so the influence of the resonance can be reduced. Therefore, the driven member 3 and the movable lens 90 can be moved accurately.

As described above, according to the driving apparatus of the embodiment, the pulse signals are used as the driving signal for the piezoelectric element 1, and the time period half of the period corresponding to the reciprocal of the lowest resonance frequency in the actuator 10 is set as the shorter output time among the high output time periods and the low output time periods of the drive signal. Thus, the moving speed of the driven member 3 can be made higher.

Further, according to the driving apparatus of the embodiment, the actuator 10 is attached so as to be supported from the side direction with respect to the expansion and contraction directions of the piezoelectric element 1, and each of the both ends thereof is set as the free end movable in the expansion and contraction directions. Thus, even when the actuator 10 is driven, the vibration caused by the expansion and contraction operation of the piezoelectric element 1 is hardly transmitted to the fixed frame 4 side. Thus, it is effective to set the driving signal of the actuator 10 in relation to the resonance frequency of the actuator 10 itself. Therefore, when the time period half of the period corresponding to the reciprocal of the resonance frequency in the actuator 10 is set as the shorter output time among the high output time periods and the low output time periods of the drive signal, the high-speed movement control of the driven member 3 can be performed surely.

Further, according to the driving apparatus of the embodiment, since the highest moving speed of the driven member 3 can be further increased, the moving speed of the driven member 3 can be controlled in a wide range from a low speed to a high speed.

Further, in the development and design of the driving apparatus, since the setting of the driving signal can be made easily, the design period can be shortened.

Furthermore, when the driving apparatus according to the embodiment is used as an actuator for a constituent part in the image pickup optical system of a camera, the size of a driving mechanism can be made small and so the camera can be miniaturized. Further, when the driving apparatus according to the embodiment is used as an actuator for a constituent part in the image pickup optical system of a camera for a mobile phone, the size of a driving mechanism can be made small and so the mobile phone can be miniaturized. Furthermore, the driving apparatus according to the embodiment can also be used as an actuator for a web camera etc.

The aforesaid embodiment shows only an example of the driving apparatus according to the invention. The driving apparatus according to the invention is not limited to the driving apparatus according to the embodiment, and the driving apparatus according to the embodiment may be modified or may be applied to another device in a scope not departing from the gist described in the respective claims.

For example, although the embodiment is explained as to the apparatus which is applied to the driving apparatus for driving the movable lens, the invention may be applied to a driving apparatus for driving a device other than the movable lens.

Further, although the embodiment is explained as to the case where the piezoelectric element 1 is attached to the fixed frame 4 via the support member 5 thereby to set the end portion of the piezoelectric element 1 as the free end, the end portion of the piezoelectric element 1 may be directly attached to the fixed frame 4.

According to the invention, the time period half of the period corresponding to the reciprocal of the lowest resonance frequency in the actuator is set as the shorter output time among the high output time periods and the low output time periods of the drive signal. Thus, the moving speed of the driven member can be made higher.

The entire disclosure of each and every foreign patent application from which the benefit of foreign priority has been claimed in the present application is incorporated herein by reference, as if fully set forth.

What is claimed is:

1. A driving apparatus comprising an actuator,
   the actuator comprising an electromechanical conversion element and a driving shaft attached to the electromechanical conversion element,
   wherein the driving apparatus expands and contracts the electromechanical conversion element by applying a driving signal to the electromechanical conversion element and reciprocally moves the driving shaft in accordance with expansion and contraction movement of the electromechanical conversion element so as to move a driven member frictionally engaged with the driving shaft, and
   wherein the driving signal is a pulse signal, and half of a time period corresponding to a reciprocal of a lowest resonance frequency in the actuator is set as a shorter output time among a high output time period and a low output time period of the drive signal.

2. A driving apparatus according to claim 1,
   wherein in a case where an off output is set in the driving signal, the half of the time period corresponding to the reciprocal of the lowest resonance frequency is set as the shorter output time among the high output time period and the low output time period, while the time period of the off output appearing after high output or low output is contained in the high output period or the low output period.

3. A driving apparatus according to claim 1,
wherein the actuator is supported from side direction in expansion and contraction directions of the electromechanical conversion element and attached, and
each of both ends of the actuator serves as a free end movable in the expansion and contraction directions.

4. A driving apparatus according to claim 2,
wherein the actuator is supported from side direction in expansion and contraction directions of the electromechanical conversion element and attached, and
each of both ends of the actuator serves as a free end movable in the expansion and contraction directions.

5. A lens driving apparatus comprising:
the driving apparatus according to claim 1; and
a lens attached to the driven member.

6. A lens driving apparatus comprising:
the driving apparatus according to claim 2; and
a lens attached to the driven member.

7. A lens driving apparatus comprising:
the driving apparatus according to claim 3; and
a lens attached to the driven member.

8. A lens driving apparatus comprising:
the driving apparatus according to claim 4; and
a lens attached to the driven member.

9. An image pickup apparatus comprising
the lens driving apparatus according to claim 5;
an image pickup element that converts an image picked-up through the lens into an electrical signal.

10. An image pickup apparatus comprising
the lens driving apparatus according to claim 6;
an image pickup element that converts an image picked-up through the lens into an electrical signal.

11. An image pickup apparatus comprising
the lens driving apparatus according to claim 7;
an image pickup element that converts an image picked-up through the lens into an electrical signal.

12. An image pickup apparatus comprising
the lens driving apparatus according to claim 8;
an image pickup element that converts an image picked-up through the lens into an electrical signal.

* * * * *